United States Patent Office 3,261,866
Patented July 19, 1966

3,261,866
N-AMINOALKYL-PHENYLSALICYLAMIDES
Melville Sahyun, Santa Barbara, and John A. Faust, Solvang, Calif.; said Faust assignor to Melville Sahyun, doing business as Sahyun Laboratories, Santa Barbara, Calif.
No Drawing. Filed July 9, 1963, Ser. No. 293,848
7 Claims. (Cl. 260—559)

This invention relates to N-aminoalkyl-phenylsalicylamides.

This is a continuation-in-part of application Serial Number 225,140, filed September 20, 1962, and now abandoned.

The invention sought to be patented, in its composition aspect, resides in the concept of a chemical compound having a molecular structure wherein there is attached to the amino nitrogen of a salicylamide an amino-lower-alkyl group and a phenyl group attached to the phenyl portion of the salicylamide structure.

The tangible embodiments of the invention in free base form are generally water insoluble solids melting at 100–200 degrees centigrade. When in the form of their acid addition or quaternary ammonium salts, they are generally white or slightly colored crystalline solids which exhibit varying degrees of solubility in water and alcohol.

The tangible embodiments of this invention possess antibacterial and antifungal activity as demonstrated by evaluation according to standard antimicrobial test procedures and they thus are useful as bactericides and fungicides, as well as other useful pharmacological activities. Because of their crystallinity and improved water-solubility, the acid addition and quaternary ammonium salts are the more convenient forms in which to use the tangible embodiments of the invention. The acid addition salts are made from the corresponding free base form in a conventional manner, exhibit the same inherent applied use characteristics and are the full equivalents of the free base form.

The compounds of the present invention may be illustrated by the structural formula:

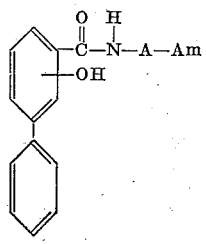

wherein A is a lower-alkylene having 2 to 4 carbon atoms; and Am is —NH$_2$, —NHR, and NRR' wherein R and R' are lower-alkyl having 2 to 4 carbon atoms, which structure contemplates both the free base form and the acid addition salt form of the compounds of this invention.

The free base compositions of the present invention are made from the corresponding salicylic acid by reaction of the acid with a suitable diamine. While the free base compositions of the present invention can be prepared directly from the salicylic acids themselves, it is more convenient to prepare them from an ester of the acid such as the methyl or phenyl ester by means of an ammonolysis reaction with the diamine.

The diamine has the general formula H$_2$N—A—Am wherein A and Am have the values hereinabove described. The —NH$_2$ portion of the diamine reacts with the acid or ester to form the amide creating the 3-position carbamyl substituent characteristic of the compounds of the present invention. If Am is to be —NH$_2$, the diamine will be an alkylene-diamine of the formula

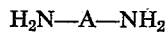

if Am is to be —NHR, then the diamine will have the formula H$_2$N—A—NHR; and if Am is to be —NRR', the diamine will have the formula H$_2$N—A—NRR' wherein A, R and R' have the values given above.

As stated above, the salicylic acid is preferably first converted to its ester. The salicylate ester and the reactant diamine are then heated together for several hours to effect displacement of the alcohol from the ester by the diamine. The cooled reaction product is taken up in dilute acid and the insoluble materials extracted by means of ether. The aqueous solution is then made slightly alkaline and the free base extracted with ether.

It will be apparent to those skilled in the art of chemistry that the free base compounds of the present invention can be converted to any desired corresponding acid addition salt and that salt may in turn be converted to other salts corresponding to the free base form. As discussed above, when the tangible embodiments of the invention are employed as antimicrobials, they ordinarily will be in the form of their acid addition salts.

Suitable acid addition salts are those derived from mineral acids, e.g., hydrochloric acid, hydrobromic acid, hydriotic acid, nitric acid, phosphoric acid and sulfuric acid; and organic salts, e.g., acetic acid, citric acid, tartaric acid, lactic acid, and the like, giving the hydrochloride, hydrobromide, hydriodide, nitrate, phosphate or acid phosphate, sulfate or bisulfate, acetate, citrate or acid citrate, tartrate or bitartrate, and lactate salts, respectively. The acid addition salts to this invention are readily convertible into the free base form and are fully equivalent thereto.

The foregoing discussion is offered to illustrate methods suitable for the practice of the invention and not to limit its scope. The invention is further illustrated by the following preparations and examples (all temperatures are reported in degrees centigrade):

PREPARATION 1.—5-PHENYL-3-BROMO-SALICYLIC ACID

The bromination of 5-phenylsalicylic acid in acetic acid yielded 5-phenyl-3-bromosalicylic acid as a white crystalline solid melting at 212–214 degrees.

Analysis.—Calculated for C$_{13}$H$_9$BrO$_3$: Neut. equiv. 293. Found: Neut. equiv. 292.

PREPARATION 2.—METHYL 3-PHENYL-SALICYLATE

A mixture of 21.4 grams (0.1 mole) of 3-phenylsalicylic acid, 15.8 grams (0.125 mole) of dimethyl sulfate, 10.5 grams (0.125 mole) of sodium bicarbonate and 100 milliliters of acetone was stirred and refluxed for twenty hours. The acetone was removed by distillation, the residue was mixed with water and extracted with ether. The ether solution was washed with dilute sodium bicarbonate and fractionated. The yield of methyl 3-phenylsalicylate was 18.2 grams (80 percent) boiling at 145–148 degrees centigrade (1 millimeter). After recrystallization from methanol, the product melted at 59–60 degrees.

This preparation illustrates the general method employed in the preparation of the intermediate methyl esters.

PREPARATION 3.—PHENYL 5-CHLORO-3-PHENYLSALICYLATE

An intimate mixture of 134 grams (0.54 mole) of 5-chloro-3-phenylsalicylic acid, 56.5 grams (0.6 mole) of phenol and 30.7 grams (0.2 mole) of phosphorous oxychloride was heated at 105–110 degrees, cautiously at first, until the evolution of gas had practically ceased (2–3 hours). The molten material was poured while hot into a stirred solution of 85 grams sodium carbonate decahydrate in 500 milliliters of water at room temperature. The oil solidified and the mixture was heated at 90 degrees for 10 minutes and filtered. After the solid had been washed thoroughly with hot water, it was recrystallized from dilute acetone. There was obtained 66.7 grams (38 percent) of phenyl-5-chloro-3-phenylsalicylate melting at 110–111 degrees.

This preparation illustrates the general method employed in the preparation of the intermediate phenyl esters. The phenyl-3-bromo-5-phenylsalicylate ester prepared in this manner melted at 103–104 degrees.

*Example 1.—N-(gamma-dimethylaminopropyl)-5-bromo-3-phenylsalicylamide*

A mixture of 31 grams (0.1 mole) of methyl-5-bromo-3-phenylsalicylate and 15 grams (0.15 mole) of gamma-dimethylaminopropyl amine was heated under reflux for 6 hours. The cooled reaction mixture was taken up in dilute hydrochloric acid and the insoluble portion was extracted with ether. The acidic aqueous solution was made slightly alkaline (about pH 9) and the insoluble basic amide was extracted with ether. The dried ether solution was evaporated to a solid residue which was recrystallized from dilute isopropyl alcohol to yield 16.5 grams (44 percent) of N-(gamma-dimethylaminopropyl)-5-bromo-3-phenylsalicylamide, melting at 146–147 degrees.

This example illustrates the general preparative method starting with the methyl ester.

*Example 2.—N-(beta-diethylaminoethyl)-5-phenylsalicylamide*

A mixture of 29 grams (0.1 mole) of phenyl-5-phenylsalicylate and 17.5 grams (0.15 mole) of beta-diethylaminoethylamine was heated under reflux and then distilled under reduced pressure to remove the excess amine and the phenol formed during the reaction. The oily residue was taken up in dilute hydrochloric acid and extracted with ether to remove the insoluble material. The aqueous solution was made alkaline with sodium carbonate and the liberated N-(beta-diethylaminoethyl)-5-phenylsalicylamide was extracted with ether.

This example illustrates the general preparative method starting with the phenyl ester.

Treatment of the ether solution with ethereal hydrogen chloride precipitated an oil which solidified and was recrystallized from a mixture of methanol and ether to obtain 13.5 grams (39 percent) of N-(beta-diethylaminoethyl)-5-phenylsalicylamide hydrochloride melting at 149–150 degrees.

The quaternary ammonium salts were prepared as follows: To a chloroform solution of the free base was added excess methyl halide and the solution was allowed to remain at room temperature for several days. The solvent and excess methyl halide were removed and the residue was solvent recrystallized.

The above general methods were employed in the preparation of further compositions of this invention as typified by the additional examples presented:

*Example 3*

N - (beta - diethylaminoethyl) - 3 - phenylsalicylamide, hydrochloride melted at 148–149 degrees after recrystallization from isopropanolether. The colorless, non-hygroscopic needles were soluble in water (10 percent at 20 degrees) and in alcohol:
*Analysis.*—Calculated: N, 8.03; Cl, 10.16. Found: N, 8.12; Cl, 10.00.

*Example 4*

N - (gamma - dimethylaminopropyl)-3-phenylsalicylamide hydrochloride melted at 157–158 degrees after recrystallization from isopropanol-ether. The white, non-hygroscopic crystals were very soluble in water (more than 50 percent at 20 degrees) and in alcohol.
*Analysis.*—Calculated: N, 8.36; Cl, 10.59. Found: N, 8.28; Cl, 10.54.

*Example 5*

N - (gamma - isopropylaminopropyl)-3-phenylsalicylamide produced from isopropylaminoethylamine and methyl 3-phenylsalicylate melted at 148–149 degrees after recrystallization from methanol. The white, non-hygroscopic crystals were less than 0.5 percent soluble in water at 20 degrees, very soluble in dilute hydrochloric acid (0.3 grams in 1 milliliter of 1 N HCl) and soluble in ether.
*Analysis.*—Calculated: N, 8.97. Found: N, 8.90.

*Example 6*

N-(beta-aminoethyl)-3-phenylsalicylamide hydrochloride melted at 242–243 degrees after recrystallization from ethanol-isopropanol. The fine, non-hygroscopic needles were approximately 3 percent soluble in water at 20 degrees and soluble in alcohol.
*Analysis.*—Calculated: N, 9.57; Cl, 12.11. Found: N, 9.64; Cl, 12.02.

*Example 7*

N-(beta-morpholinoethyl)-3-phenylsalicylamide hydrochloride melted at 195–196 degrees after recrystallization from isopropanol. The colorless, non-hygroscopic needles were more than 20 percent soluble in water at 20 degrees.
*Analysis.*—Calculated: N, 7.72; Cl, 9.77. Found: N, 7.56; Cl, 9.58.

*Example 8*

N - (gamma - dimethylaminopropyl) - 3 - phenylsalicylamide mandelate melted at 123–124 degrees after recrystallization from ethanol-ether. The fine white needles were at least 10 percent soluble in water at 20 degrees.
*Analysis.*—Calculated: N, 6.22. Found: N, 6.18.

*Example 9*

N - (beta - diethylaminoethyl) - 5 - phenylsalicylamide hydrochloride melted at 149–150 degrees after recrystallization from methanol-ether. The light tan solid compound was soluble in water.
*Analysis.*—Calculated: N, 8.03. Found: N, 7.84.

*Example 10*

N - (gamma - dimethylaminopropyl) - 3 - phenylsalicylamide methiodide melted at 142–143 degrees after recrystallization from isopropanol. The colorless needles were 5 percent soluble in water and soluble in alcohol.
*Analysis.*—Calculated: N, 6.36; I, 28.82. Found: N, 6.48; I, 28.03.

*Example 11*

N - (gamma - dimethylaminopropyl) - 5 - bromo - 3-phenylsalicylamide melted at 146–147 degrees after recrystallization from dilute isopropanol. The crystalline solid was soluble in alcohol.
*Analysis.*—Calculated: N, 7.43. Found: N, 7.38.

*Example 12*

N - (gamma - dimethylaminopropyl) - 5 - bromo - 3-phenylsalicylamide methiodide melted at 168–169 degrees after recrystallization from methanol-ether. The pinkish crystals were 5 percent soluble in water and soluble in alcohol.
*Analysis.*—Calculated: I, 24.43. Found: I, 24.56.

*Example 13*

N - (gamma - dimethylaminopropyl) - 5 - chloro - 3-phenylsalicylamide melted at 148–149 degrees after recrystallization from dilute ethanol. The yellowish crystals were soluble in alcohol.
*Analysis.*—Calculated: N, 8.42. Found: N, 8.55.

*Example 14*

N - (gamma - dimethylaminopropyl) - 3 - bromo - 5-phenylsalicylamide melted at 181–182 degrees after recrystallization from ethanol. The yellow crystals were soluble in alcohol.
*Analysis.*—Calculated: N, 7.43. Found: N, 7.63.

Example 15

N - (gamma - dimethylaminopropyl) - 3 - bromo - 5 - phenylsalicylamide methiodide melted at 186–187 degrees after recrystallization from ethanol. The yellow needles were 5 percent soluble in water and soluble in alcohol.

*Analysis.*—Calculated: I, 24.43. Found: I, 24.20.

Example 16

N - (beta - diethylaminoethyl) - 5 - chloro - 3 - phenylsalicylamide melted at 142–143 degrees after recrystallization from dilute isopropanol. The yellowish powder was insoluble in water and soluble in alcohol.

*Analysis.*—Calculated: N, 8.07. Found: N, 7.81.

Example 17

N - (beta - diethylaminoethyl) - 5 - bromo - 3 - phenylsalicylamide melted at 149–150 degrees after recrystallization from isopropanol. The colorless powder was insoluble in water and soluble in alcohol.

*Analysis.*—Calculated: N, 7.16. Found: N, 6.83.

Example 18

N - (beta - diethylaminoethyl) - 5 - bromo - 3 - phenylsalicylamide methiodide melted at 178–179 degrees after recrystallization from ethyl acetate-ether. The tan crystals were less than 1 percent soluble in water and soluble in alcohol.

*Analysis.*—Calculated: I, 23.80. Found: I, 23.64.

Example 19

N - (beta - diethylaminoethyl) - 5 - phenylsalicylamide methobromide was obtained as colorless needles melting at 187–188 degrees after recrystallization from ethanol.

*Analysis.*—Calculated: N, 6.88. Found: N, 6.83.

As illustrated below, the compositions of this invention exhibit a wide spectrum of antibacterial and antifungal properties. In addition, the oral toxicity of representative compounds was found to be in the range of 1.5 to 1.6 grams per kilogram of bodyweight in the test animal. This compares favorably with the toxicity of salicylic acid or acetylsalicylic acid which has been reported in the literature to be approximately 1.2–1.4 grams per kilogram of bodyweight.

The acid addition salts of the compounds of this invention are water-soluble and stable in aqueous solutions. Such properties make the compositions suitable for use in pharmaceutical preparations, such as ointments, creams, ionic and non-ionic shampoos, and the like.

ANTIFUNGAL AND ANTIBACTERIAL ACTIVITY OF REPRESENTATIVE COMPOUNDS

| Test Organism | Minimal Inhibitory Concentrations milligrams per milliliter of compound of example number | | | |
|---|---|---|---|---|
| | 3 | 4 | 5 | 6 |
| *C. albicans* | | | 1.0 | 1.0 |
| *Sac. carlsbergensis* | | | 1.0 | 1.0 |
| *Mucor ramaninianus* | 1.0 | 1.0 | 0.5 | 0.5 |
| *Fusarium epispharia* | 1.0 | 1.0 | 0.25 | 0.25 |
| *Hormodendrum cladosporoides* | 1.0 | 1.0 | 0.25 | 0.25 |
| *T. mentagrophytes* | 1.0 | 1.0 | 0.25 | 0.05 |
| *M. gypseum* | 1.0 | 1.0 | 0.25 | 0.125 |
| *Botrytis cinerea* | 0.5 | 0.5 | 0.125 | 0.25 |
| *Penicillium digitatum* | 0.5 | 0.5 | 0.5 | 1.0 |
| *Myrothecium verrucaria* | 1.0 | 1.0 | 0.25 | 0.5 |
| *Alternaria solani* | 0.5 | 0.5 | 0.5 | 0.5 |
| *Aspergillus fumigatus* | 1.0 | 1.0 | 0.5 | 0.5 |
| Mycobacter | 0.05 | 0.05 | 0.05 | 0.05 |
| Staph | 0.5 | 0.5 | | 0.25 |
| Sarcina | 0.5 | 0.5 | | 0.125 |
| Subtilis | 0.25 | 0.25 | | 0.125 |
| Pseudomonas | | | | 0.5 |
| Proteus | 1.0 | 1.0 | | 0.25 |
| Coli | 0.25 | 0.25 | | 0.25 |
| Salmonella | 0.5 | 0.5 | | 0.125 |

Various modifications of this invention will suggest themselves to one skilled in the art and the invention is not to be limited to the above-offered examples. The subject matter which the applicants regard as their invention is particularly pointed out and distinctly claimed as follows.

What is claimed is:

1. A compound of the formula:

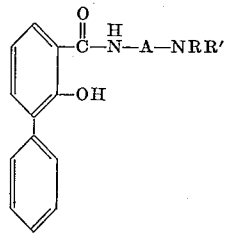

wherein A is lower-alkylene having 2 to 4 carbon atoms and R and R' are lower-alkyl having 1 to 4 carbon atoms.

2. A compound of the formula:

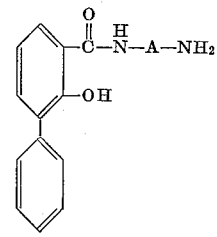

wherein A is lower-alkylene having 2 to 4 carbon atoms.

3. A compound of the formula:

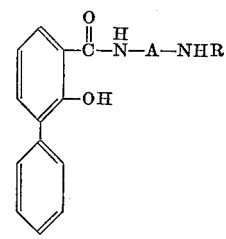

wherein A is lower-alkylene having 2 to 4 carbon atoms and R is lower-alkyl having 1 to 4 carbon atoms.

4. N-(beta-diethylaminoethyl)-3-phenylsalicylamide hydrochloride.

5. N-(beta-aminoethyl)-3-phenylsalicylamide hydrochloride.

6. N-(gamma-dimethylaminopropyl)-3-phenylsalicylamide hydrochloride.

7. N-(gamma-isopropylaminopropyl)-3-phenylsalicylamide.

References Cited by the Examiner

UNITED STATES PATENTS 2,899,437   8/1959   Shapiro et al. _____ 260—295

FOREIGN PATENTS 874,206   8/1921   Great Britain.

OTHER REFERENCES

Burger: Medicinal Chemistry (1960), page 1050.

HENRY R. JILES, *Acting Primary Examiner.*

J. A. NARCAVAGE, *Assistant Examiner.*